(12) United States Patent
Alspector et al.

(10) Patent No.: US 8,060,507 B2
(45) Date of Patent: *Nov. 15, 2011

(54) FILTERING SYSTEM FOR PROVIDING PERSONALIZED INFORMATION IN THE ABSENCE OF NEGATIVE DATA

(75) Inventors: Joshua Alspector, Colorado Springs, CO (US); Aleksander Kolcz, Colorado Srpings, CO (US)

(73) Assignee: AOL Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/987,046

(22) Filed: Jan. 7, 2011

(65) Prior Publication Data

US 2011/0125578 A1    May 26, 2011

Related U.S. Application Data

(63) Continuation of application No. 12/470,530, filed on May 22, 2009, now Pat. No. 7,890,505.

(51) Int. Cl.
G06F 17/30   (2006.01)

(52) U.S. Cl. ........ 707/731; 707/727; 707/728; 707/803; 706/45

(58) Field of Classification Search .............. 707/727, 707/728, 731, 769, 770, 802, 803; 709/217, 709/219; 705/14.72, 14.73, 26.1; 706/45
See application file for complete search history.

(56) References Cited

U.S. PATENT DOCUMENTS

| | | |
|---|---|---|
| 5,185,813 A | 2/1993 | Tsujimoto |
| 5,519,608 A | 5/1996 | Kupiec |
| 5,649,068 A | 7/1997 | Boser et al. |
| 5,675,819 A | 10/1997 | Schuetze |
| 5,870,740 A | 2/1999 | Rose et al. |
| 5,905,863 A | 5/1999 | Knowles et al. |
| 5,920,854 A | 7/1999 | Kirsch et al. |
| 5,920,859 A | 7/1999 | Li |
| 5,926,808 A | 7/1999 | Evans et al. |
| 5,940,821 A | 8/1999 | Wical |
| 5,974,412 A | 10/1999 | Hazlehurst et al. |
| 6,009,410 A | 12/1999 | LeMole et al. |
| 6,014,666 A | 1/2000 | Helland et al. |
| 6,189,002 B1 | 2/2001 | Roitblat |
| 6,285,999 B1 | 9/2001 | Page |

(Continued)

OTHER PUBLICATIONS

Dempster, A.P. et al., "Maximum Likelihood from Incomplete Data via the EM Algorithm," Journal of the Royal Statistical Society, Series B 39, 1977, pp. 1-38.

(Continued)

Primary Examiner — Shahid Alam
(74) Attorney, Agent, or Firm — Finnegan, Henderson, Farabow, Garrett & Dunner, LLP

(57) ABSTRACT

Systems and methods are provided for personalizing advertising for a user. In accordance with certain implementations, information is accessed indicating which documents were selected by a user and which documents were not selected by a user. At least one positive word vector is generated using words contained in at least one of the selected documents, and at least one negative word vector is generated using words contained in at least one of the unselected documents. Document word vectors are generated, and a document rank order is established based on a vector space relationship analysis. Categories associated with the documents are ranked based on the document rank order, and the ranked categories are sent to an ad server. Advertising material associated with the ranked categories may then be received from the ad server in a selected context.

33 Claims, 4 Drawing Sheets

U.S. PATENT DOCUMENTS

| | | |
|---|---|---|
| 6,341,277 B1 | 1/2002 | Coden et al. |
| 6,347,317 B1 | 2/2002 | Singhal |
| 6,397,211 B1 | 5/2002 | Cooper |
| 6,430,559 B1 | 8/2002 | Zhai |
| 6,560,590 B1 | 5/2003 | Shwe et al. |
| 6,567,797 B1 | 5/2003 | Schuetze et al. |
| 6,728,701 B1 | 4/2004 | Stoica |
| 7,031,961 B2 | 4/2006 | Pitkow et al. |
| 2001/0047353 A1* | 11/2001 | Talib et al. .................... 707/769 |
| 2003/0004995 A1 | 1/2003 | Novaes |
| 2003/0069877 A1 | 4/2003 | Grefenstette et al. |

OTHER PUBLICATIONS

Joachims, T. et al., "WebWatcher: A Tour Guide for the World Wide Web," Proceedings of the International Joint Conference on Artificial Intelligence, 1997.

Notice of Allowance issued in U.S. Appl. No. 09/721,008, mailed Feb. 24, 2009, 7 pages.

Notice of Allowance issued in U.S. Appl. No. 12/470,530, mailed Oct. 8, 2010, 8 pages.

Office Action issued in U.S. Appl. No. 09/721,008, mailed May 20, 2004, 55 pages.

Office Action issued in U.S. Appl. No. 09/721,008, mailed Sep. 21, 2005, 20 pages.

Rocchio, Jr., J.J. et al., Relevance Feedback in Information Retrieval, G. Salton (ed.), "The SMART Retrieval System: Experiments . . . ," Prentice-Hall, 1971, pp. 313-323.

Vapnik, V.N., "Statistical Learning Theory," John Wiley & Sons, Inc., New York, 1998, pp. 1-721.

Yu, Clement et al., "Finding the Most Similar Documents . . . ," Proceedings of the IEEE Forum Research and Technology Advances in Digital Libraries, May 19-21, 1999, pp. 150-162.

\* cited by examiner

FILTERING SYSTEM FOR PROVIDING PERSONALIZED INFORMATION IN THE ABSENCE OF NEGATIVE DATA

CROSS-REFERENCE TO RELATED APPLICATIONS

This application is a continuation of U.S. application Ser. No. 12/470,530, filed May 22, 2009 (now allowed) now U.S. Pat. No. 7,890,505, which claims the benefit of priority of U.S. application Ser. No. 09/721,008, filed Nov. 22, 2000 (now U.S. Pat. No. 7,567,958), and claims the benefit of U.S. Provisional Application No. 60/194,429, filed Apr. 4, 2000. The disclosure of each of the above-referenced applications is incorporated herein by reference.

BACKGROUND OF THE INVENTION

Technical Field

The present invention relates generally to information filtering, and more particularly, to a system for creating a model of user preferences for content based on a user's history of selecting text articles for viewing in an online environment.

Statement of the Problem

The huge amount of information available at any one time in the evolving world wide information infrastructure, and particularly the volume of information accessible via the Internet, can easily overwhelm someone wishing to locate specific items of this information. Although it is advantageous to have such a large quantity of information available, only a small amount of it is usually relevant at any time to a given person. In order to provide a manageable volume of relevant information, an intelligent filtering system that 'understands' a user's need for specific types of information is invaluable. A user model which captures the user's preferences for information is thus required. Many methods are known in the art for creating such a user model with varying degrees of intrusiveness and effectiveness.

One presently known way of reducing this tremendous volume of information to a relevant and manageable size is to use an 'information filtering agent' which can select information according to the interest and/or need of a user. However, at present, few information filtering agents exist for the evolving world wide multimedia information infrastructure, and particularly for the Internet.

Historically, user modeling has been applied to information filtering in the literature and in practice. This modeling has become important commercially with the advent of the Internet. The Internet makes possible access to information, product sales, services and communication for anyone with access thereto. However, the Internet presents an overwhelming amount of information and a large number of items to purchase. It is thus difficult for a human to sort through this tremendous volume of Internet content without some help from a filtering or recommendation service. Therefore, 'personalization' of Internet content and advertising is needed to reduce the myriad of choices down to a manageable number for a given individual.

All previously known personalization technologies rely on building a model of a user's preferences. Therefore, personalization requires modeling the user's mind with as many of the attendant subtleties as possible. Ideally, a perfect computer model of a user's brain would determine the user's preferences exactly and track them as the user's tastes, context, or location change. Such a model would allow a personal newspaper, for example, to contain all of the articles the user is interested in, and none of the articles in which the user is not interested. The perfect model would also allow advertisers to generate banner ads with 100% 'click-through' rates (i.e., a viewer would peruse every ad displayed) and would allow e-commerce vendors to present only products that each given user would buy.

Fill-in profiles represent the simplest form of user modeling for personalization technology. When using a fill-in profile, the user fills in a form, which may ask for demographic information such as income, education, children, zip code, sex and age. The form may further ask for interest information such as sports, hobbies, entertainment, fashion, technology or news about a particular region or institution. Internet web sites that have registration procedures typically request information of this sort. Vendors may target advertising based on these profiles in exchange for users having access to the content site. Such profiles are the basis for almost all of the targeted advertising currently used on the Internet. This type of simple user model misses much of the richness of a user's interests because these interests do not necessarily fall into neat categories. Privacy-concerned users may also purposefully enter inaccurate information when forced to deal with this model. Furthermore, most people have trouble articulating the full range of their preferences even when not restricted by a form.

Another filtering method is called 'clique-based recommendation', which is also known as 'collaborative filtering'. This method presumes that if a person's stated preferences are similar to those of a group or clique of others in some aspects, the person's preferences will also be similar to the clique's preferences in other aspects. For example, if a particular viewer likes a certain set of movies and a clique of other viewers enjoy the same set, then it is likely that other movies enjoyed by that clique will also be enjoyed by the viewer. Because the Internet makes it easy to collect preference information for a large group, collaborative filtering has become the basis for many presently known recommendation services. Note that collaborative filtering is a richer form of recommendation than a fill-in profile because, for example, it is difficult to characterize a book simply by noting that it is in the category of sports. A problem with clique-based systems, however, is the need for explicit feedback by the user, such as a buying or rating decision.

Feature-based recommendation is a more sophisticated form of preference profiling because it considers multiple aspects of a product and how they may interact. For example, a person may like movies that have the features of action-adventure, rated R (but not G), and which receive a good review by a particular critic. Such features or attributes of a product can be used to create a sophisticated preference model for an individual user. A multiple-feature classifier such as a neural network can capture the complexity of user preferences if the feature set is rich enough.

Text-based recommendation is a rich form of feature-based recommendation. Years of research in information retrieval has yielded methods of characterizing text which are quite effective. These methods are generally referred to as word vector-space methods. The concept behind text-based 'recommenders' is that documents containing the same frequencies of words can be grouped together or clustered. Documents whose word frequencies are similar are considered closely clustered in the word vector space. Thus, if a user selects certain documents, then it is likely that the user would want to read other documents that have similar word frequencies. Because most of the information on the Internet (including news, product descriptions, and advertising) is in the form of text, text-based recommendation methods can be used to more accurately determine users' preferences for all sorts of Internet information. It is desirable that such methods be completely unobtrusive to a user, by not requiring the user to fill in a form or rate products.

Several techniques are known in the art for prioritizing word-based content by asking users to rate articles on a numerical scale. These techniques assemble training data that contains both positive (highly rated articles) and negative (low rated articles) data. However, the need to rate articles is a burden to users. If a user is asked to look at all the articles in an archive or news site and read all the ones of interest, it is also possible to assemble a set of positive data (all the articles the user read or clicked on) and negative data (all those not read). Although the user is not asked for a numerical rank, a binary value can be assigned to each article (either read or not read). However, this, too, is a burden. The more usual scenario for an online newspaper has a reader perusing some of the articles but not having time to read all of them. One cannot assume, a priori, that unread articles are of no interest to the user, so the negative data are thus uncertain. Thus, what is needed is a truly unobtrusive system which operates on only positive data.

Solution to the Problem

The present invention overcomes the aforementioned problems of the prior art and achieves an advance in the field by providing a system which allows a viewer to read an online newspaper or other content site in an information environment such as the Internet in a manner already familiar to the viewer.

The method of the present invention observes the user's actions during the normal course of browsing through a content site, and creates a model of the user's preferences for various types of articles. This model is created as an Internet user 'clicks' on articles which the user desires to read, without requiring any other feedback from the user. The user model is then employed to reorganize the content site so that the articles preferred by the user are brought to the fore for easy access. This model can also be used to present the user with advertising material based on the user's demonstrated interests.

The system of the present invention performs the above functions by using word vector-space representation of the documents combined with adaptive learning techniques. A word vector for a document is created by counting all the occurrences of each word in a document and creating a vector whose components comprise the word frequencies. A document is represented by a point in a high-dimensional space whose axes represent the words in a given dictionary. Thus, similar documents are close together in this vector-space. Generally, 'stop words' ("and", "the", "on", etc.) are eliminated and stems of words are used so that, for example, "see" and "seeing" are considered to be the same word. The word vector of an article forms the input to an adaptive ranking engine. The output of the ranking engine is a value which represents the strength of a particular user's preference for reading that article. In this manner, the contents of an online newspaper or an archive of any type can be rank ordered by the numerical value of the output of the ranking system.

Known techniques for prioritizing word-based content by asking users to numerically rate articles assume, a priori, some arbitrary low rating for unread articles, so the negative data are thus uncertain. Therefore, a truly unobtrusive system should operate on only positive data. The system of the present invention creates a user model by ranking articles for an individual user without requiring negative data or feedback from a user (reader). This user model is then used to personalize content in an information environment such as an online newspaper.

Various techniques, such as fill-in profiles, collaborative filtering and text-based methods, may be used to create a user model for content preferences. Text-based methods are used as input to a learning system in the present invention. There are a variety of learning systems known in the art for use with text-based features. These learning systems include Bayesian techniques, Rocchio's method, neural networks, and support vector machines. Most of these methods are computationally expensive, especially when it is desired to optimize estimates of negative data, making the methods unsuitable for an online system serving large numbers of users. Because of the high-dimensional vector space in which word-based ranking engines operate, a simplification of some of these methods, especially support vector machines, is possible. Although the use of Bayesian techniques and Rocchio's method may not be computationally efficient for online systems, these methods may nevertheless be employed by the present system where off-line processing is feasible.

In the prior art, a user typically forms a query by typing in keywords or a natural language query. The document set is then searched for similarity to the query. Typically, Rocchio's method for information retrieval is employed to determine similarity to the query, which involves specifying a distance measure (often a normalized inner product) between the query vector and the document vector. Documents with the smallest distance are ranked highest. The method of the present invention can use a Rocchio's algorithm to rank articles as well as other techniques, which are described below.

The present system uses word vectors to represent documents. In the system of the present invention, queries are not explicitly typed by the user. Instead, a query is formed implicitly by the vector of all documents previously read by the user. This query is a potentially long vector of word frequencies, which represent the personal interests of the user. In contrast, the document set is composed of short vectors, typically a headline or title and, perhaps, a lead paragraph or a summary. Therefore, the present system measures distance between the long vector representing the implicit query of the interests of the user and the short vectors representing the contents of the document set. These short vectors, in one embodiment of the invention, may have binary components representing the presence or absence of each word, thereby simplifying the computation of document relevance.

DETAILED DESCRIPTION

Figure 1:
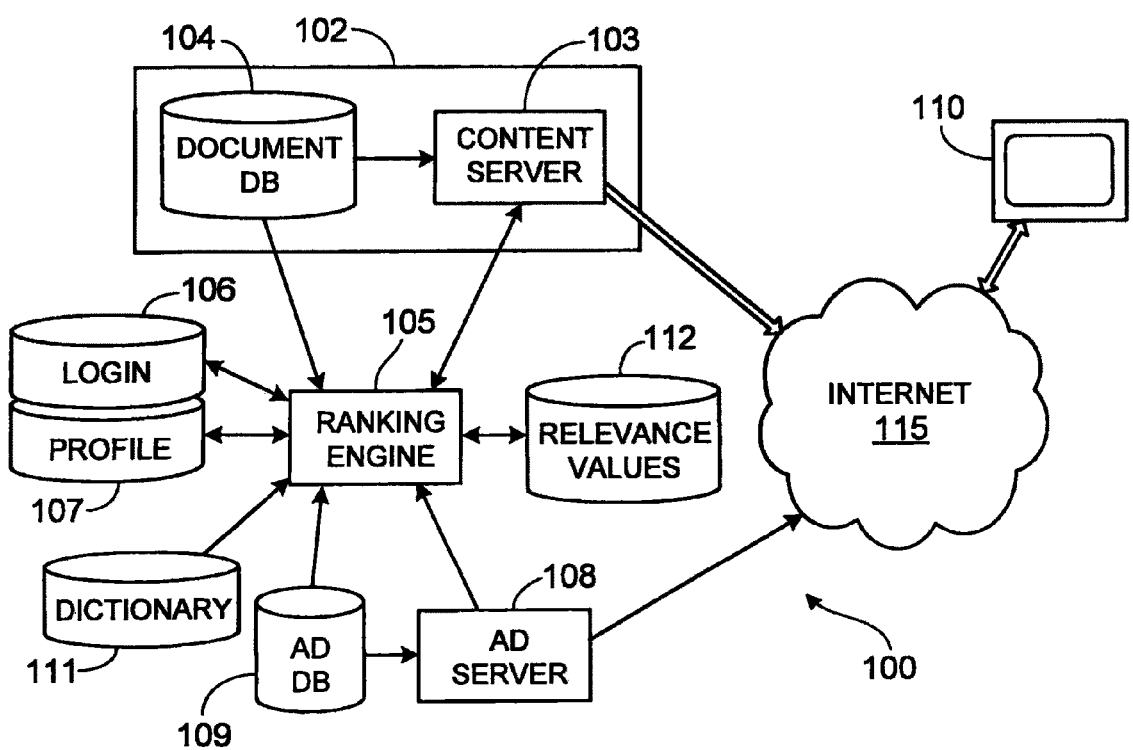
FIG. 1 is a diagram of an exemplary embodiment of the present system for personalizing content and advertising.

FIG. 1 is a diagram of an exemplary embodiment of the present system 100 for personalizing content and advertising.

As shown in FIG. 1, documents, such as articles in an online newspaper, are stored in a document database or other document repository 104 at a content site 102. Content site 102 also includes content server 103, which is coupled to document database 104. The embodiment described herein uses the Internet 115 (or any other suitable information transmission medium) to transmit the documents from content server 103 to a computer 110, where the documents are viewed by a user via a web browser, or the like. In an exemplary embodiment, HTTP protocol is used for fetching and displaying the documents, but any suitable document display protocol may alternatively be employed.

The system described so far allows unpersonalized delivery of information to users. In order to personalize the information for a particular user, a database is created that identifies each unique user through a login procedure in the presently described embodiment. Either the content site 102 or a third party (not shown), therefore, maintains a separate login database 106 of user information.

In the presently described embodiment, information associated with a given user is divided into two databases (or any other type of document repository). One database 106 contains information facilitating user login and password registration, and a second database 107 is used to store user profile data. Profile database 107 contains combined 'word vectors' (described in detail below) that represent the articles read by a user. These combined word vectors are accompanied by algorithm-specific representation of the profile data ('user query vectors', also described below). To allow for users' interests to change, this profile data is made adaptive by periodically deleting documents that are 'old' based on any desired criteria. One method of providing an adaptive profile is to store a fixed maximum number of documents and delete the oldest documents when the maximum number is reached. Data in profile database 107 is used by a ranking engine 105 to rank articles, contained in document database 104, for each user. The ranking of articles, explained in detail below, is accomplished by software and/or hardware on content server 103, or on another computer, using the method of the present system. Ranking engine 105, along with login and profile databases 106/107, are typically part of content site 102, but may, alternatively, be located at a third party site, remote from content site 102.

Figure 2:
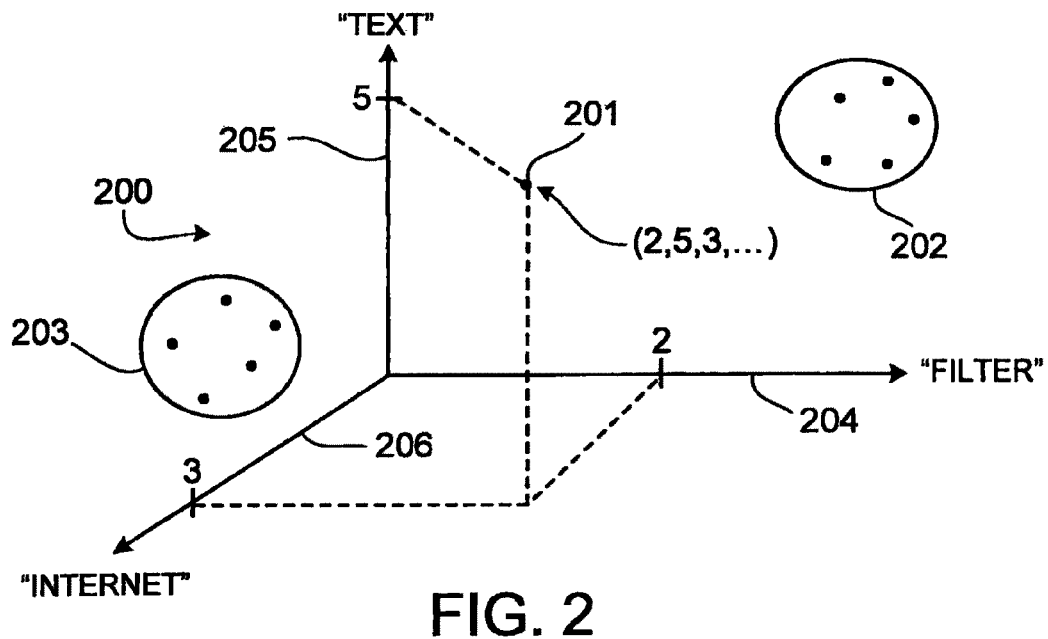
FIG. 2 depicts a subset of axes representing three dimensions in a word vector space.

FIG. 2 depicts a subset of axes representing three dimensions in a word vector space 200. The three axes shown represent the words "filter", "text" and "Internet". A typical dictionary for use with documents has thousands of words, but it is infeasible to depict such a high-dimensional vector space on a two-dimensional drawing. It is to be understood, however, that a typical word vector space may have thousands of dimensions. Each point in the diagram of FIG. 2 represents a document with the coordinates of the point representing the frequencies of the corresponding word within the document. For short document excerpts such as headlines of news articles, the values of the components are likely to be zero or one. In general, the entire word vector representing the document will likely contain many zeroes because most of the significant words in document dictionary 111 will not be in any one document. In this particular word vector space 200, as well as in the 'real' high-dimensional vector space, documents containing similar concepts are found close together. On the other hand, dissimilar documents are far apart as given by a distance measure in this space. A typical metric, well-known in the art, representing the distance between two documents in this vector space is formed by the normalized dot product (also known as the inner product) of the two vectors representing the documents.

As shown in FIG. 2, the group of points indicated by reference number 202 represents a cluster of documents each containing the words "text" and "filter", and the group of points indicated by reference number 203 represents a cluster of documents containing the words "text" and "Internet". For example, the document indicated by reference number 201, at coordinates (2, 5, 3, . . . ) contains 2 instances of "filter", 5 instances of "text", and 3 instances of "Internet", as indicated by the relative distances of each component word along its respective axis.

As discussed in detail below with respect to FIG. 3, the present method creates a word vector for each document in database 104. A word vector comprises a number of word count descriptors (up to the total number of words in the document dictionary), each of which indicates a count of all of the occurrences of each word contained in document dictionary 111 that are also contained in a given document, or a preselected segment thereof, such as a headline, lead or summary. The count usually has a maximum value of 1 for a short headline; in an alternative embodiment, the count may be set to 1 for any number of occurrences (greater than one) of the same word within a document. In another alternative embodiment, the present method may use different dictionaries according to the context of a given word. Document dictionary 111 typically contains many thousands of words relevant to certain selected topics. An exemplary word vector is formatted as shown below in Table 1, although any format suitable for input to a particular ranking engine 105 may be employed.

TABLE 1

| Dictionary words | W1, W2, W3, W4, W5, . . . Wn |
| Words in document | W1, W3, W4 |
| Word vector | 1, 0, 1, 1, 0, . . . 0 |

As can be seen from Table 1, dictionary 111 contains words W1-Wn, and the document headline (or lead) contains words W1, W2, and W4. The word vector thus formed is:

1, 0, 1, 1, 0 . . . 0 where a "1" is placed in the ith position (the ith word count descriptor) in the word vector for each Wi appearing in a given document headline that has a counterpart Wi in the dictionary, and zeroes are placed in all other positions. Words in the document that are not in the dictionary are ignored.

Full word frequency information, as shown in FIG. 2, describes the general case for a word vector space, in that the word count descriptors in each word vector may have a count greater than one. However, for headlines and leads, word frequencies are rarely greater than one. Therefore, restricting a word count descriptor to a binary frequency (i.e., a count of either 1 or 0 for each word) is often a very good approximation. A binary word count descriptor also simplifies implementation of the present method, and provides better results when used in conjunction with some algorithms such as support vector machines. It is to be noted that the present invention may employ word vectors comprising either binary or full-frequency word count descriptors.

Figure 3:
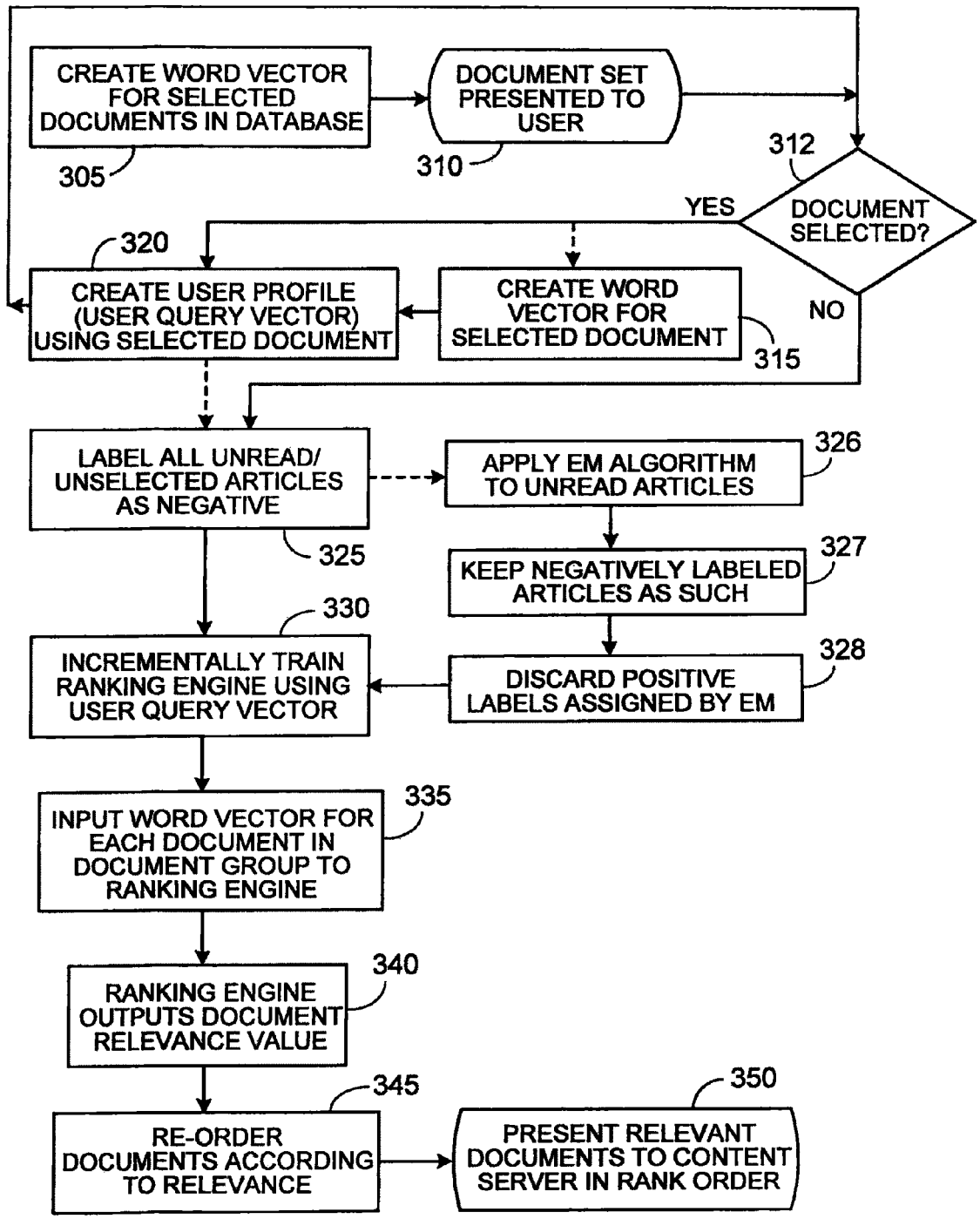
FIG. 3 is a flowchart illustrating, at a high level, steps which may be performed in practicing one embodiment of the method of the present invention.

FIG. 3 is a flowchart illustrating, at a high level, steps which may be performed in practicing one embodiment of the method of the present invention. Operation of the present system 100 is best understood by viewing FIGS. 1 and 2 in conjunction with one another. As shown in FIG. 3, at step 305, in an off-line, or pre-processing operation, a word vector is created for each document in database 104, or for a preselected subset of documents therein (i.e., a single web page), typically from words appearing in headlines or leads. Word vectors may be stored in a user's profile in profile database 107 in a First-In First-Out (FIFO) queue. Note that either the full vectors or only their pointers can be stored in a FIFO. Alternatively, the documents in database 104 may be pre-processed to generate word vectors which are stored in a separate part of database 104, with pointers to the respective full documents. At step 310, in response to a request by a user, a set of document headlines or otherwise synopsized documents (a 'document set') is presented to a user by content server 103, to be displayed on computer 110. At step 312, if no documents are selected from the presented document set (e.g., if the user exits the current document set, or chooses another document set), processing continues as described below at step 325; otherwise, processing continues as directly follows.

If all documents in database 104 are not pre-processed to create word vectors (i.e., if step 305 is not performed), then at step 315, the word vector for the user-selected document is created on the fly as the user reads the document. Next, at step 320, a user query vector is created which represents all of the documents that have been selected by the user over the period of time covered by the documents presently stored in the user's profile. As indicated above, the profile data is made adaptive by periodically deleting older documents. This user query vector is part of the user profile for this particular user, which is stored in profile database 107. A user query vector is a type of word vector created in essentially the same manner as the word vector described above. An exemplary user query vector is formatted as shown below in Table 2, although any format suitable for input to a particular ranking engine 105 may be employed.

TABLE 2

| Words in selected documents | W1, W3, W4, W1, W4, W1 |
| Dictionary words | W1, W2, W3, W4, W5, ... Wn |
| User query vector | 3, 0, 1, 2, 0, ... 0 |

A user query vector is created which represents each document selected by a user by indicating a count of all of the occurrences of each word contained in document dictionary 111 that are also contained in the documents which are presently stored in the user's profile. As shown in Table 2, with respect to words W1-W5, which appear in document dictionary 111, the selected documents in the user profile contain a total of 3 instances of word W1, 0 instances of word W2, 1 instance of word W3, 2 instances of word W4, and so forth. The user query vector thus formed is:

3, 0, 1, 2, 0, ... 0.

Accordingly, at step 320, the existing user query vector for the present user is updated by the word vector representing the words present in the currently selected document, both of which are then stored in the user's profile in database 107. At this point, processing may proceed directly to step 325, or continue at step 312 (described above), where it is determined whether the user selects another document or exits the current set. As indicated above with respect to step 312, if another document in the current set is selected, then step 320 is repeated; if the user exits the current set (or document display program), processing continues with step 325, below.

At step 325, all (or, more likely, a random sample; there are usually too many articles available for computational efficiency) 'unread' articles, or alternatively, all articles that are presented to the user but not selected for reading, are labeled as 'negative'. If it is feasible to process the unread (or unselected) articles off-line, then steps 326 through 328 are performed to take advantage of the Expectation Maximization (EM) algorithm (Dempster, A. P., Laird, N. M. and Rubin, D. B.: 1977, "Maximum likelihood from incomplete data via the EM algorithm", *Journal of the Royal Statistical Society, Series B* 39, 1-38). The EM algorithm provides a mechanism for augmenting a ranking system for personalization of news with unlabeled documents (i.e., documents that are labeled neither positive or negative with respect to a viewer's interests) when no negative data are present. If off-line processing is not feasible or not desired, then processing continues at step 330, described further below.

Document Labeling Using the Expectation Maximization Algorithm

In the alternative embodiment of steps 326-328, the on-line material provided by content server 103 is assumed to be composed of sections (sports, business news, etc.), where each section consists of a list of article headlines or summaries, each pointing the user to a full version of the article. Since a user usually has no trouble identifying the general section of interest, the present alternative embodiment rank-sorts the article leads in each section such that the material likely to be more relevant to the user appears near the top of the list and is thus easier to access. In such a context, personalization of these news articles is reduced to user-specific ranking of articles in each newspaper section.

Given labeled documents/articles and unlabeled documents/articles, the Expectation Maximization algorithm provides a means of estimating the positive/negative labels which are missing from the unselected (or unread) documents. The EM algorithm is a general iterative procedure designed to obtain maximum-likelihood parameter estimates in incomplete-data environments. Using labeled/unlabeled data corresponding to selected/unselected documents, at step 326, the EM algorithm is executed in a sequence of two-step iterations until convergence is reached. In the Expectation step, the current parameter values are used to estimate the missing data labels while, in the Maximization step, the values of model parameters are re-computed using the fixed labels as well as the label-estimates through application of the maximum likelihood principle. The result of executing the EM algorithm is a set of relevance probability estimates, for the documents in the unlabeled set. As a further enhancement to the document labeling performed in step 326, the EM algorithm may be implemented in conjunction with a multinomial naive Bayes classifier.

At step 327, all documents/articles negatively labeled in step 326 are stored with the corresponding negative labels in the user's profile in database 107. At step 328, all of the positive labels assigned by the EM algorithm in step 326 are discarded.

At step 330, adaptive ranking engine 105 is incrementally 'trained' using a Support Vector Machine (SVM) or other word vector space ranking technique by means of the user query vector created in step 320. In the case of an SVM, a determination is made if the new word vector is a 'support' vector by means of an optimization technique known in the art. If not, no further action is needed; if the new word vector is a 'support' vector, a new decision boundary is calculated and a reprioritization of articles must be calculated. In the case of a Naïve Bayes ranking algorithm, new probabilities are calculated and used to reprioritize the list of articles. In the case of Rocchio's algorithm, new combined vectors are composed for reprioritization of articles. Note that this recalculation may be done either on the fly or, periodically, offline.

Document ranking techniques which may be used advantageously with the present system are described below with respect to FIG. 4. Document ranking can be a continuous process as the reader reads new articles each day and ranking engine 105 is incrementally trained, Note that Support Vector Machines are advantageous here because if new articles are not support vectors, retraining is unnecessary. Support vector machines work well for high dimensional spaces and do not require time-consuming preprocessing. Furthermore, the word vectors can be used directly once the support vectors are found; i.e., no re-representation of the data (as, for example, with a hidden layer of neurons in a multi-layer perceptron neural network) is needed. The stored word-vector representation functions advantageously in determining the decision boundary. The use of Support Vector Machines as learning engines to build a categorizer for the purpose of tagging (categorizing) articles or prioritizing advertisements ('ads') is described in greater detail below with respect to FIGS. 5A and 5B.

Document Ranking

At step 335, the word vector for each document in the database (or, more practically, in the group of articles desired to be ranked) is provided as input to ranking engine 105. In an exemplary embodiment of the present system 100, the building of profile database 107 is based only on the information relevant to the user's choice, such as headlines and leads in documents in document database 104. This can be generalized to images and sounds for use in more advanced information systems. The user query vectors represent the preferences of each user and are composed of only positive data in the sense that it is believed that the user prefers to read similar articles. It is, however, advantageous to also have feedback from each user indicating what types of articles the user would prefer not to read (the negative data), but negative data are not available in the presently described embodiment of the invention.

The present system utilizes the assumption that the articles not read can be used to form similar vectors of word frequencies representing the negative data for each user. The positive vector and negative vector together can form a 'query' for selecting preferred articles using the method of Rocchio (Rocchio, J.: 1971, Relevance feedback in information retrieval, in G. Salton (ed.), *The SMART Retrieval System: Experiments in Automatic Document Processing*, Prentice-Hall, pp. 313-323). Rocchio's method is commonly used for search engines on the Internet where, as previously mentioned, the query consists of typed in keywords and is short. The documents to be searched on the Internet are web pages and may be quite long. In the case of the present invention, the situation is reversed. The query is long and the documents, such as headlines, may be quite short. The 'learning' in Rocchio's method comprises simply assembling the positive and negative vectors based on user actions. The query is formulated as the positive vector minus a fraction of the negative vector. The ranking of documents uses the distance metric in the word vector space whereby documents close to the query vector are ranked more highly than distant ones.

A second approach to document ranking used in an alternative embodiment of the present system may be termed Naïve Bayes. Bayesian techniques refer to the use of conditional probabilities for, in this case, calculation of relevance in document ranking. If count is made of all documents read by a user, along with a corresponding determination of how many of them contain word W1, a determination can be made of the probability of the relevance of the document, given that it contains word W1. Similarly, a determination can be made of the probability of non-relevance, given W1, if negative information is available. Naïve Bayes refers to a naive assumption that each word in a document is independent of all others. Thus, it is possible to determine the relevance of a document by simply multiplying the relevance/non-relevance probabilities of the words contained therein using the rules of statistical inference. The higher the probability, the higher is the rank given by the simple algorithm.

A further alternative embodiment of the present system uses a learning technique known as a Support Vector Machine (SVM), which can be thought of as a type of neural network. An SVM works best in a high dimensional space of the type formed by words in a dictionary. In high-dimensional spaces, classification boundaries, such as the boundary between relevant and non-relevant documents, are often hyperplanes. A hyperplane (simply a straight line in two dimensional space) is described by a linear equation leading to a particularly simple distance calculation, which is well-suited for fast online implementation.

Figure 4:
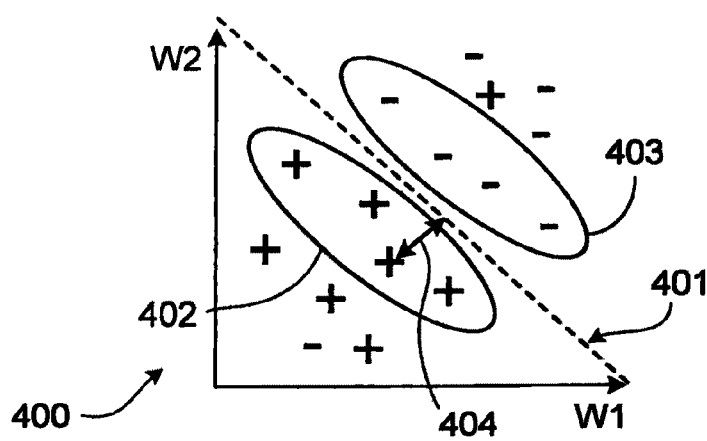
FIG. 4 is a diagram depicting a document classifier in two dimensional space corresponding to two words in a dictionary.

FIG. 4 depicts a document classifier 400 in two dimensional space corresponding to only two dictionary words, represented by axes W1 and W2, respectively. The generalization to the case of thousands of dimensions operating in the case of the invention is understood by those skilled in the art but is impossible to represent in a two-dimensional diagram. The data points in the diagram of FIG. 4 correspond to word vectors of relevant and non-relevant documents (indicated by "+" and "−" characters, respectively) for a unique user. It is apparent from FIG. 4 that, for the most part, a straight line (dotted line 401), called a 'classification boundary', separates the two (relevant and non-relevant) classes of documents with only a few errors. Note that if we had a third axis available, it is possible that a plane could correctly separate all exemplars with no errors. This observation motivates the theorem that a separating surface in high-dimensional spaces is likely to be a hyperplane. The degree of relevance of a new document to the user may be measured by the distance to the classification boundary, as indicated by arrow 404 between a support vector and classification boundary 401 (e.g. rank of article=1/distance). Those documents whose word vectors are located within this predetermined distance from the classification boundary form the 'support vectors' of the SVM, which are shown in FIG. 4 as document groups 402 and 403. There are a variety of methods known in the art for determining these support vectors. The distance from the classification boundary within which a word vector must fall to be considered a support vector may be determined by an optimization procedure, usually quadratic programming.

A new document may or may not be a support vector. In accordance with the system of the present invention, the set of support vectors assembled as a user reads documents determines the learned preferences of the user. The present system uses SVMs for document ranking, as well as classification, by means of a distance measure. Any one of several known heuristic methods based on computational geometry may be used to determine if a new article's word vector may be a support vector. If it is unlikely to be such, then no retraining of the support vector machine is needed. The heuristically calculated distance to the classification boundary of an SVM may be used to determine when to retrain the SVM. Using SVMs in the environment of the present system results in high accuracy combined with computational efficiency.

Support Vector Machines (SVMs) (Vapnik, V. N.: 1998, *Statistical Learning Theory*, John Wiley, New York) represent a class of machine-learning algorithms that explicitly estimate the location of the inter-class boundary. SVMs have been shown to be very effective in many classification tasks, including text categorization. In the classification setting, an SVM transforms the input domain into a possibly infinite dimensional space, in which the classification boundary can be modeled as a hyperplane. To identify the best hyperplane, an SVM finds a set of training points that directly determine the classification-error margin and ignores the rest of the training set. The chosen points are known as support vectors. In particular, given a set of linearly-separable points, $$\{x,y:y=\pm 1 \times \epsilon \Re^D\}$$

an SVM is defined by a hyperplane for which the inequality $$y(w \cdot x + b) \geq 1$$

is satisfied by all elements of the training set and the norm of the hyperplane normal vector, z, is minimal. SVM implementations which may be used advantageously in the present system include a linear-kernel SVM and, for example, the SVM_LIGHT package written by Thorsten Joachims (Joachims, T., Freitag, D. and Mitchell, T.: 1997, Webwatcher: A tour guide for the world wide web, *Proceedings of the International Joint Conference on Artificial Intelligence*).

After applying one of the document ranking methods described above to the word vector for each document in the group of articles to be ranked, ranking engine 105 outputs, at step 340, a document relevance value which represents the strength of a particular user's preference for reading a given article. The relevance values are temporarily stored in a file (e.g., file 112 in FIG. 1), in order to be sorted.

At step 345, the document relevance value output by ranking engine 105 is then input to content server 103 which uses the article's rank value to determine whether to present the article to the user, or to determine how to rank the article for the purpose of later presentation to the user.

Finally, at step 350, the relevant documents (or articles) that comprise the output of step 345 are sent to content server 103 in rank order, from which point the documents are sent to computer 110 to viewed by the user.

Advertising Personalization

The present system 100 may also be used to personalize advertising or marketing messages for each individual user. Presently, advertising is often served by agencies that may not be part of the content site 102. Therefore, these agencies typically use a separate server computer 108 to send advertising material stored in advertising database 109 to ranking engine 105. Advertising may also be personalized by information stored in profile database 107. This personalized information is often demographic information such as age, sex, zip code, family income, interests and such other information as may be requested by a web site (e.g., site 102) as part of an initial registration procedure. The present invention uses the word-based information stored in a given user profile in database 107 to personalize advertising either with or without regard to any other user profile information that may be collected. One step in such personalization is associating each document in database 104 with an interest category. Advertisers can use interest categories for targeting advertisements to users most likely to be interested in a particular product or service. As described below, the present system 100 automatically labels articles with categories useful to advertisers and also labels users with a hierarchical description of their interests, which can be passed on to advertisers in a context-specific manner.

In operation, profile database 107 contains information regarding each user's interests gleaned automatically from the articles that they have read. This information is sent by ranking engine 105 to ad server 108 whenever a user is logged into a content site served by the ad network. The ad server can then prioritize advertising or marketing messages in a manner similar to the way the content server prioritizes articles. In an exemplary embodiment, these priorities are assigned by ranking engine 105 and simply passed on to content server 103 and ad server 108. Alternatively, ranking engine 105 sends ad server 108 a list of user interests, in order of relevance, to be used internally in the ad serving process.

Categorization of Articles Using Support Vector Machines

Figure 5A:
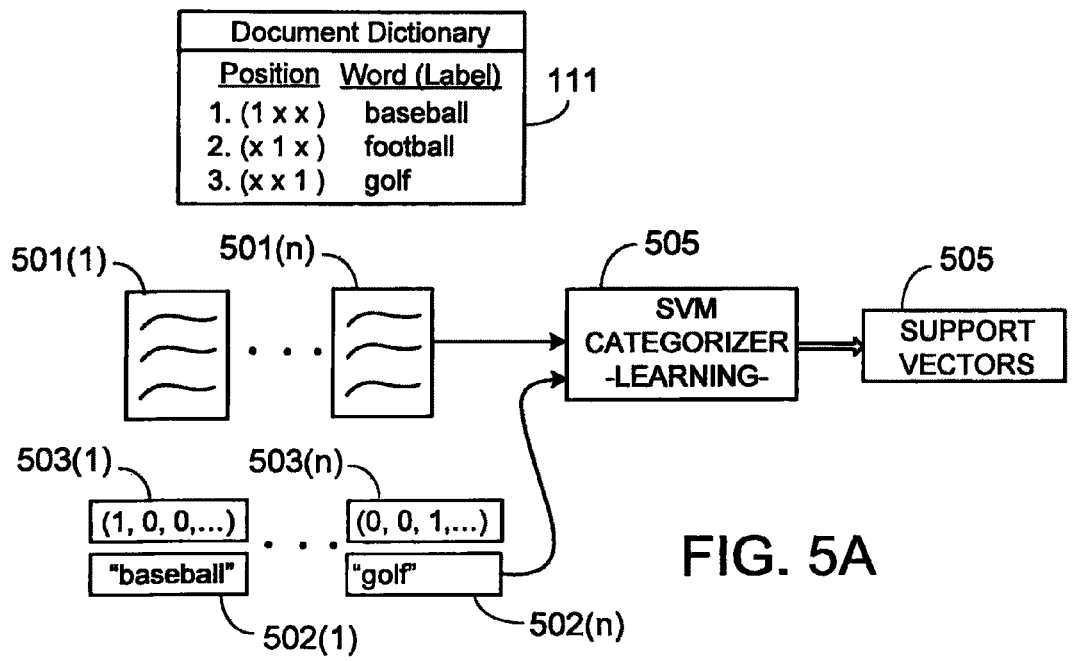
FIGS. 5A and 5B illustrate the use of a Support Vector Machine in tagging articles.
Figure 5B:
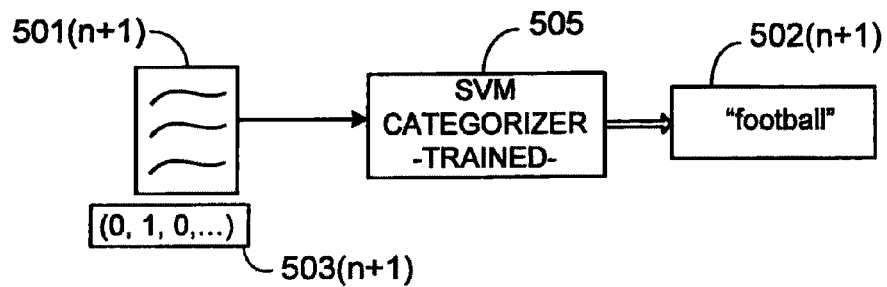

Support Vector Machines can also be used as learning engines to build a categorizer for the purpose of categorizing (classifying) articles or prioritizing advertisements ('ads'). FIGS. 5A and 5B illustrate the use of a Support Vector Machine in tagging articles. As shown in FIG. 5A, during learning (training) mode, labeled documents 501(1) through 501(n) are input to SVM categorizer 505. In the example shown, documents 501(1) and 501(n) have word vectors (1, 0, 0, . . . ) [reference no. 503(1)] and (0, 0, 1, . . . ) [ref. no. 503(n)], respectively, with corresponding predefined labels "baseball" 502(1) and "golf" 502(n). Support vectors 505 and corresponding classification boundaries are generated by SVM categorizer 505 during this learning process. It can be seen that the correspondence between the labels and word vectors is determined by the relative position of the label (i.e., the word) in document dictionary 111.

As shown in FIG. 5B, after an initial learning period, SVM categorizer 505 receives input document 501(n+1) having word vector (0, 1, 0, . . . ) [ref. no. 503(n+1)]. At this point, SVM categorizer 505 is 'trained', therefore, it automatically outputs the label "football" 502(n+1), which has the corresponding word vector (0, 1, 0, . . . ) [ref. no. 503(n+1)]. SVM categorizer 505 is able to provide this label, since the category "football" has been predetermined and used in training the categorizer.

A support vector machine can be trained to distinguish between categories of articles. For example, by training on articles about 'football' and articles about 'not football', a binary decision boundary can be formed. This process can be repeated multiple times for each category desired. One known method categorizes articles using the score of each category as assigned by these multiple binary categorizers.

In one aspect of the present system, articles or advertisements are initially assigned to an appropriate user-interest category. In order to prioritize articles for ads, a person reads articles and tags them with interest categories suitable for advertisers. For example, a reader of an article about French Polynesia may be categorized as having an interest in "travel to tropical islands" After enough articles are labeled, a support vector machine learns to automatically label future articles related to "travel to tropical islands" with appropriate tags, so that these articles may be presented to a viewer having an interest that has been 'tagged' as including these categories. Someone with knowledge of users' interests and their relation to advertising categories of interest to vendors tags the articles appropriately during training The trained categorizer then can label new articles with interest categories appropriate for a particular advertising campaign. Each user would then have an advertising profile consisting of a set of interest categories, as evidenced by their reading habits, with a relevance score attached to each. This technique is an advance over the current state of the art where interest categories are assigned to keywords used in searching a page, no relevance is done, and only unsophisticated Boolean operations can be performed on the categories. The present system allows for sophisticated numerical shades of gray in describing interests of a user. These are part of the user's profile.

Note that the above technique will also work for unlabeled news articles that need to be categorized in various new categories. Support vector machines will also work with word-based documents of any sort that require automatic categorization. For example, certain sales documents may be appropriate for wealthy customers while others may not be. Advertising may then be ranked for a particular user and/or documents may be categorized in particular categories as a function of the distance from the classification boundary in a support vector machine. After users' interests are prioritized with a numerical score of relevance, the categorized ads can be matched-up with the viewer's prioritized interests.

In an alternative embodiment, the present system personalizes advertising in essentially reverse fashion (relative to the above-described method) by first selecting a context (e.g. time, location, or page tag such as "Wednesday afternoon"), and then classifying each document in the restricted advertising user profile in a hierarchical fashion, according to a set of categories shared with an ad server. The degree of relevance of the interest categories for each user is then communicated to the ad server so that advertisements are presented to the viewer in the context selected.

Given a pool of advertisements eligible for display, the ad server prioritizes those which have been associated in the ad database with the interest categories returned by the present method. This method uses hierarchical interest categories (e.g., sports > basketball > college > Duke) and gives a prioritized set of interests (e.g., Science 0.9, local 0.4, college basketball 0.5, etc.) as opposed to an unprioritized list without any structure. The current art uses Boolean operation on keywords or interests (e.g., golf AND women) without any score assigned to the relevance of these interests for a user.

It may, in some cases, be advantageous to use more than just the headlines of news articles to perform the ranking because of the small number of words involved. In such cases, it is possible to include a summary of the article for use in generating the word vector. The full article is likely to be too long and may slow down the computation of the ranking engine. A summary allows a richer and more specific match to user interests in a word vector space. A summary may consist of the first paragraph of a news story or a more sophisticated natural language processing method may be employed to summarize the articles. Summaries generally lead to better precision in ranking articles according to user preferences than leads but may not be quite as precise as whole articles. However, the use of summaries is likely to provide better computational performance than the use of entire articles due to the fewer number of words involved.

While exemplary embodiments of the present invention have been shown in the drawings and described above, it will be apparent to one skilled in the art that various embodiments of the present invention are possible. For example, the specific configuration of the overall system, the specific steps performed in ranking documents, as well as the particular methods employed for document ranking, the specific format of the word vectors and user query vectors, as described above, should not be construed as limited to the specific embodiments described herein. Modification may be made to these and other specific elements of the invention without departing from its spirit and scope as expressed in the following claims.

What is claimed is:

1. A method for use in personalizing advertising for a user, the method comprising:
    accessing information indicating which documents in a set of documents were selected by a user for viewing and which documents in the set of documents were not selected by the user for viewing;
    generating at least one positive word vector using words contained in at least a segment of at least one of the documents that was selected by the user for viewing;
    generating at least one negative word vector using words contained in at least a segment of at least one the documents that was not selected by the user for viewing;
    generating document word vectors for at least some of the documents that were selected by the user for viewing;
    performing, using at least one processor, a vector space relationship analysis of the positive word vector, the negative word vector, and the document word vectors;
    establishing, using at least one processor, a document rank order of the documents selected by the user for viewing based on the performed vector space relationship analysis;
    classifying the documents selected by the user for viewing in predetermined categories;
    ranking the predetermined categories based on the document rank order;
    sending the ranked categories to an ad server; and
    receiving advertisements associated with the ranked categories from the ad server in a selected context.

2. The method of claim 1, wherein the documents in the set of documents are available at a website.

3. The method of claim 1, wherein the segment is one or more of a headline of the document, a lead of the document, or a summary of the document.

4. The method of claim 1, further comprising:
    applying an expectation maximization algorithm to the documents in the document set that were not selected by the user for viewing to generate negative labels for certain ones of the non-selected documents, and positive labels for the rest of the non-selected documents; and
    wherein generating at least one negative word vector comprises generating at least one negative word vector using words contained in at least a segment of the documents for which the expectation maximization algorithm generates negative labels.

5. The method of claim 1, further comprising:
    accessing a document dictionary that contains dictionary words; and
    wherein generating document word vectors comprises, for each document in the group of documents, storing a count of the number of occurrences of each dictionary word found in the document.

6. The method of claim 1, wherein performing a vector space relationship analysis comprises training a support vector machine with the positive word vector and the negative word vector and inputting the document word vectors into the trained support vector machine.

7. The method of claim 1, wherein performing a vector space relationship analysis comprises applying Rocchio's method to the positive word vector, the negative word vector, and the document word vectors.

8. The method of claim 1, wherein performing a vector space relationship analysis comprises applying Naïve Bayes techniques to the positive word vector, the negative word vector, and the document word vectors.

9. The method of claim 1, further comprising:
    training a support vector machine by inputting documents labeled with the predetermined categories; and
    wherein classifying the documents selected by the user for viewing comprises using the trained support vector machine to label the documents with the predetermined categories.

10. The method of claim 1, wherein the context is a time.

11. The method of claim 1, wherein the context is a location.

12. An article of manufacture comprising a computer-readable storage device storing computer-readable instructions which, when executed, cause one or more processing devices to perform the following:

access information indicating which documents in a set of documents were selected by a user for viewing and which documents in the set of documents were not selected by the user for viewing;

generate at least one positive word vector using words contained in at least a segment of at least one of the documents that was selected by the user for viewing;

generate at least one negative word vector using words contained in at least a segment of at least one of the documents that was not selected by the user for viewing;

generate document word vectors for at least some of the documents that were selected by the user for viewing;

perform, using at least one processor, a vector space relationship analysis of the positive word vector, the negative word vector, and the document word vectors;

establish, using at least one processor, a document rank order of the documents selected by the user for viewing based on the performed vector space relationship analysis;

classify the documents selected by the user for viewing in predetermined categories;

rank the predetermined categories based on the document rank order;

send the ranked categories to an ad server; and receive advertisements associated with the ranked categories from the ad server in a selected context.

13. The manufacture of claim 12, wherein the documents in the set of documents are available at a website.

14. The manufacture of claim 12, wherein the segment is one or more of a headline of the document, a lead of the document, or a summary of the document.

15. The manufacture of claim 12, wherein the instructions further comprise instructions that cause the one or more processing devices to:

apply an expectation maximization algorithm to the documents in the document set that were not selected by the user for viewing to generate negative labels for certain ones of the non-selected documents, and positive labels for the rest of the non-selected documents; and wherein, to generate at least one negative word vector, the instructions include instructions that cause the one or more processing devices to generate at least one negative word vector using words contained in at least a segment of the documents for which the expectation maximization algorithm generates negative labels.

16. The manufacture of claim 12, wherein the instructions further comprise instructions that cause the one or more processing devices to:

access a document dictionary that contains dictionary words; and wherein, to generate document word vectors, the instructions include instructions that cause the one or more processing devices to, for each document in the group of documents, store a count of the number of occurrences of each dictionary word found in the document.

17. The manufacture of claim 12, wherein, to perform a vector space relationship analysis, the instructions further include instructions that cause the one or more processing devices to train a support vector machine with the positive word vector and the negative word vector and input the document word vectors into the trained support vector machine.

18. The manufacture of claim 12, wherein, to perform a vector space relationship analysis, the instructions further include instructions that cause the one or more processing devices to apply Rocchio's method to the positive word vector, the negative word vector, and the document word vectors.

19. The manufacture of claim 12, wherein, to perform a vector space relationship analysis, the instructions further include instructions that cause the one or more processing devices to apply Naïve Bayes techniques to the positive word vector, the negative word vector, and the document word vectors.

20. The manufacture of claim 12, wherein the instructions further comprise instructions that cause the one or more processing devices to:

train a support vector machine by inputting documents labeled with the predetermined categories; and wherein, to classify the documents selected by the user for viewing, the instructions include instructions that cause the one or more processing devices to use the trained support vector machine to label the documents with the predetermined categories.

21. The manufacture of claim 12, wherein the context is a time.

22. The manufacture of claim 12, wherein the context is a location.

23. A system for use in personalizing advertising for a user, the system comprising:

one or more processing devices; and one or more storage devices storing instructions which, when executed, cause the one or more processing devices to implement:

a content server configured to present documents, from a set of documents, to a user such that the user can select documents for viewing;

at least one positive word vector formed using words contained in at least a segment of the documents in the set of documents that are selected by the user for viewing;

at least one negative word vector formed using words contained in at least a segment of the documents in the set of documents that are not selected by the user for viewing;

one or more document word vectors for at least some of the documents that were selected by the user for viewing;

a ranking engine configured to:

perform a vector space relationship analysis of the positive word vector, the negative word vector, and the document word vectors;

establish a document rank order of the documents selected by the user for viewing based on the performed vector space relationship analysis;

classify the documents selected by the user for viewing in predetermined categories; and rank the predetermined categories based on the document rank order; and an ad server, operatively coupled with the ranking engine, for presenting, to the user in a selected context, advertisements associated with the ranked categories.

24. The system of claim 23, wherein the documents in the set of documents are available at a website.

25. The system of claim 23, wherein the segment is one or more of a headline of the document, a lead of the document, or a summary of the document.

26. The system of claim 23, wherein the at least one negative word vector is generated by:

applying an expectation maximization algorithm to the documents in the document set that were not selected by the user for viewing to generate negative labels for certain ones of the non-selected documents, and positive labels for the rest of the non-selected documents; and wherein generating at least one negative word vector comprises generating at least one negative word vector using words contained in at least a segment of the documents for which the expectation maximization algorithm generates negative labels.

27. The system of claim 23, wherein the instructions further cause the one or more processing devices to implement:
a document dictionary that contains dictionary words; and
wherein the document word vectors are generated by storing, for each document in the group of documents, a count of the number of occurrences of each dictionary word found in the document.

28. The system of claim 23, wherein the ranking engine is configured to perform the vector space relationship analysis by training a support vector machine with the positive word vector and the negative word vector and inputting the document word vectors into the trained support vector machine.

29. The system of claim 23, wherein the ranking engine is configured to perform the vector space relationship analysis by applying Rocchio's method to the positive word vector, the negative word vector, and the document word vectors.

30. The system of claim 23, wherein the ranking engine is configured to perform the vector space relationship analysis by applying Naïve Bayes techniques to the positive word vector, the negative word vector, and the document word vectors.

31. The system of claim 23, wherein the instructions further cause the one or more processing devices to implement:
a support vector machine trained by receiving documents labeled with the predetermined categories; and
wherein the ranking engine is configured to classify the documents selected by the user for viewing by using the trained support vector machine to label the documents with the predetermined categories.

32. The system of claim 23, wherein the context is a time.

33. The system of claim 23, wherein the context is a location.

* * * * *